United States Patent [19]

Elfenthal et al.

[11] Patent Number: 5,451,252
[45] Date of Patent: Sep. 19, 1995

[54] SUBPIGMENTARY TITANIUM DIOXIDE WITH IMPROVED PHOTOSTABILITY

[75] Inventors: Lothar Elfenthal, Langenfeld; Rolf Schwindt, Leverkusen; Manfred Kluwig, Windhagen, all of Germany

[73] Assignee: Kronos Inc., Hightstown, N.J.

[21] Appl. No.: 333,689

[22] Filed: Nov. 3, 1994

Related U.S. Application Data

[63] Continuation-in-part of Ser. No. 87,302, Jul. 8, 1993, abandoned.

[51] Int. Cl.$^6$ .................... C09C 3/00; C01G 23/00
[52] U.S. Cl. ........................... 106/436; 423/266
[58] Field of Search ............ 106/436, 441, 439, 430, 106/440; 423/266

[56] References Cited

U.S. PATENT DOCUMENTS

| | | | |
|---|---|---|---|
| 2,297,523 | 9/1942 | Allan | 106/441 |
| 3,214,283 | 10/1965 | Chopoorian | 106/439 |
| 4,036,662 | 7/1977 | Rademachers et al. | 106/439 |
| 4,373,013 | 2/1983 | Yoshizumi | 106/441 |
| 4,753,829 | 6/1988 | Panush | 427/385.5 |

FOREIGN PATENT DOCUMENTS

| | | | |
|---|---|---|---|
| 1467482 | 11/1969 | Germany | 106/439 |
| 2545243 | 4/1977 | Germany | 106/436 |

OTHER PUBLICATIONS

Translation of German patent 2,545,243, Apr., 1977.

*Primary Examiner*—Steven Bos
*Attorney, Agent, or Firm*—Michael J. Cronin

[57] ABSTRACT

Subpigmentary titanium dioxide with decreased photoactivity is produced if known ions for increasing photostability in titanium dioxide pigments are not deposited on the surface of the subpigmentary particles, but instead are included intracrystallinely in the pigment particle (i.e., doped). In a preferred process for preparation of doped subpigmentary titanium dioxide particles, an acid solution containing the dopant is added in two stages to a suspension of subpigmentary titanium dioxide.

16 Claims, No Drawings

SUBPIGMENTARY TITANIUM DIOXIDE WITH IMPROVED PHOTOSTABILITY

RELATED APPLICATION

This is a continuation-in-part application of pending U.S. patent application Ser. No. 08/087,302 filed Jul. 8, 1993, the contents of which are hereby incorporated by reference.

BACKGROUND OF THE INVENTION

This invention relates to a process for preparing subpigmentary titanium dioxide with increased photostability through doping, in which a hydrolyzable titanium compound is subject to a two step ripening or aging treatment in a tank or vessel, and to an optional post-treatment. The invention further relates to subpigmentary titanium dioxide containing a doping substance (dopant) for improving its photostability.

The term "subpigmentary titanium dioxide" refers to titanium dioxide having a particle size in the range from about 10 to about 100 nm. Titanium dioxide subpigmentary particles have little or no light scattering properties because of their size, and are made by processes very different from those used to manufacture pigmentary titanium dioxide. Subpigmentary titanium dioxide, which is a recent development, is used as a transparent UV absorber, e.g., in paints, glazes, plastics and cosmetics. In metallic paints, subpigmentary titanium dioxide can be used to achieve special optical effects (e.g. "down flop" optical effects, see Panush, U.S. Pat. No. 4,753,829). Elfenthal et al., U.S. Pat. No. 5,215,580 describes a process for preparing subpigmentary titanium dioxide in which the particle size of the subpigmentary titanium dioxide can be influenced via addition of a colloidal tin oxide prepared in a special process.

Titanium dioxide pigments, having a physical minimum size greater than 100 nm, can be characterized by their scattering power for visible light. It has been long known to use titanium dioxide as a white pigment (particle size predominantly in the range of 200 to 500 nm) in paints, fibers, plastics and other systems. It is also known that such use can lead to undesired reactions, which cause disintegration of the medium surrounding the titanium dioxide particle. Such reactions are initiated by ultraviolet (UV) irradiation [see for example, H. G. Völz, G. Kämpf, H. G. Fitzby, A. Klaeren, ACS Symposium Ser., 151 (1981) 163]. In this decomposition a catalytic effect is attributed to the titanium dioxide. The reactions underlying this decomposition occur predominantly at the surface of the pigmentary titanium dioxide particle. The influence of UV radiation on the photostability of a pigment can be described, for example, by means of a test for greying.

Since subpigmentary titanium dioxide, due to its much smaller particle size, has a surface area approximately 10 to 20 greater than times that of pigmentary titanium dioxide, subpigmentary titanium dioxide has a higher photoactivity or a smaller so-called light stability.

It is known to post-treat pigmentary titanium dioxide particles in order to lower photoactivity. The customary post-treatment is to coat the particles with oxides of silicon, zirconium and aluminum (see, for example European Patent 393,857-A1; European Patent 430,424-A2; or Japanese Patent 02-194063). For many applications, however, such a post-treatment when used with subpigmentary titanium dioxide does not result in sufficient photochemical stabilization.

Furthermore, in the preparation of titanium dioxide pigments according to the sulfate process it is known to add certain substances before calcining in order to decrease the photoactivity. In subsequent thermal treatment a portion of the precipitated metal ions diffuse into the interior of the crystals of the pigmentary titanium dioxide particles. In the case of chloride process - titanium dioxide pigments, dopants which increase the light stability or decrease the photoactivity are directly deposited intracrystallinely in the titanium dioxide particles by introducing the dopants into the oxygen-titanium tetrachloride burner.

In addition, with traditional titanium dioxide pigments it is known to precipitate substances, which can function as dopants for reducing photoactivity, in a one step process, onto the titanium dioxide pigment, and subsequently to anneal the pigment. Since this process involves a diffusion-controlled phenomenon, tempering must be carried out at high temperatures, and in some cases for extended times (German Patent No. 25 45 243; 0.1-10 hours).

It is not possible to use procedures of the above types to treat subpigmentary titanium dioxide, since such heat conditions would cause particle growth of the subpigmentary titanium dioxide and the creation of undesired normal-sized pigment particles. Such a treatment is also excluded by economic considerations in view of the larger surface area involved with subpigmentary particles and the resulting need for much larger amounts of dopant.

As used herein, the terms "intracrystalline inclusion" and "bulk doping" are understood to refer to a substantially homogeneous distribution of the foreign substance (i.e., dopant) in the internal regions of the crystalline titanium dioxide particles. This is to distinguish the term from "interstitial inclusion", which is a surface treatment on, or between, titanium dioxide pigment particles.

Prior to the present invention, attempts to distribute a dopant intracrystallinely in subpigmentary titanium dioxide particles have not been successful.

SUMMARY OF THE INVENTION

It is the object of the present invention to provide improved subpigmentary titanium dioxide with improved photostability.

A further object of the invention is to provide subpigmentary titanium dioxide which is doped in a highly homogeneous manner, i.e., which has a dopant distributed intracrystallinely therein.

It is also an object of the invention to provide a process at low temperatures for preparing intracrystallinely doped subpigmentary titanium dioxide which has improved photostability.

These and other objects of the invention are achieved by a process for preparing subpigmentary titanium dioxide, comprising the steps of providing a suspension of subpigmentary titanium dioxide; introducing an acid (also referred to as solution) containing a portion of dopant into the suspension; maintaining (maturing or ripening) the suspension for a period of time, adding additional dopant and maintaining the suspension for additional time, and recovering subpigmentary titanium dioxide comprising a crystalline lattice with the dopant distributed intracrystallingely throughout the lattice.

In accordance with a further aspect of the invention, subpigmentary titanium dioxide particles which, for the first time, comprise a crystalline lattice with a dopant for improving photostability distributed intracrystallinely throughout the lattice are created.

DETAILED DESCRIPTION OF THE PREFERRED EMBODIMENT

This invention discloses a process for preparing subpigmentary titanium dioxide in which a titanium compound in suspension is subjected to a two step ripening treatment, also often called an aging treatment, and optionally to a post-treatment in a tank or vessel; wherein a dopant is added before or during the first ripening treatment and the suspension maintained for a period of time, and additional dopant added and the suspension maintained for a further time period prior to any optional post-treatment.

The process is based on the two-step addition of the dopant at a suitable point during the preparation of the subpigmentary titanium dioxide, so that doping of the entire subpigmentary titanium dioxide particle (bulk doping) takes place during the formation of the particle, and thermal diffusion steps are not needed. It is a unique charteristic of the inventive processing method that the dopant addition neither causes interference with the formation of the desired crystal structure, nor exercises any significant influence on the building of a particular subpigmentary particle form, or desired particle size, or particle size distribution.

The invention also relates to bulk-doped subpigmentary titanium dioxide, i.e., a titanium dioxide under 100 nm in which the dopant for reducing the photoactivity is not accumulated predominantly on the surface of the particle, but the active foreign atoms are substantially uniformly incorporated into the entire particle.

As used herein, the term "dopant" is understood to refer to metal ions, such that a dopant may comprise either ions of a single structuring or a mixture of several types of ions. Preferably, the metal ions are used in the form of their chlorides or oxides. Useful dopants which improve the photostability of titanium dioxide include: (In the following list, the type of ion is named first and then the compound in which the ions, after being dissolved in hydrochloric acid, are usually added to the hydrolyzed or partially hydrolyzed titanium compound.

$Fe^{2+}$ as $FeCl_2$
$Fe^{3+}$ as $FeCl_3.4H_2O$
$Sb^{3+}$ as $SbCl_3$
$Zn^{2+}$ as $ZnCl_2$
$Mn^{2+}$ as $MnCl_2.2H_2O$
$Nb^{5+}$ as $NbCl_5$
$V^{3+}$ as $VCl_3$
$V^{5+}$ as $V_2O_5$
$Ni^{2+}$ as $NiCl_2.6H_2O$
$Cu^{2+}$ as $CuCl_2$
$Ta^{5+}$ as $TaCl_5$
$V^{3+}+Nb^{5+}$ as $VCl_3/NbCl_5$
$Mn^{+2}/Nb^{5+}$ as $MnCl_2.2H_2O/NbCl_5$
$Fe^{2+}/Fe^{3+}$ as $FeCl_2/FeCl_3.4H_2O$
$Ni^{2+}/Sb^{3+}$ as $NiCl_2.6H_2O/SbCl_3$
$Ni_{2+}/Sb^5$ as $NiCl_2.6H_2O/SbCl_5$

With the following ions a small change in the photostability of subpigmentary titanium dioxide could be observed.

$Al^3$ as $AlCl_3.6H_2O$
$In^{3+}$ as $InCl_3$
$Ce^{3+}$ as $Ce_2(SO_4)_3$
$CE^{4+}$ as $Ce_2(SO_4)_2$
$Sn^{4+}$ as $SnCl_4$; but all were found suitable for use The quantity of solution added is selected so that the atomic concentration of the dopant preferably lies between 0.1% and 2.0%, relative to titanium. In the case of combinations, the atomic concentration is understood to be that of the aggregate of the individual components.

The starting basis for the inventive process is an aqueous suspension of subpigmentary titanium dioxide. Hydrolyzable subpigmentary titanium compounds may be used as initial materials, and include titanium dioxide salt, titanates, titanium tetrachloride, organic titanium compounds and sodium titanate partially hydrolyzed with hydrochloric acid, the sodium titanate being formed by reacting a titanium dioxide hydrate, obtained through hydrolysis of titanyl sulfate solution, with sodium hydroxide. The reaction of the hydrolyzable titanium compounds takes place in a tank or vessel; the liquid in the vessel may be water or water to which an acid or base has been added. After the suspension is formed, the addition of the dopant which is normally dissolved in acid takes place before the initial ripening treatment (ripening treatment #1) and is concluded after the addition of additional dopant, before the completion of the second ripening treatment (ripening treatment #2). The initial ripening treatment includes usually a heat treatment. The second ripening treatment also often comprises a heat treatment and, in particular, a peptization of the type required when titanates are used as the initial material. Such peptization achieves a substantially colloidal distribution of the titanium dioxide. The dopant is normally dissolved in an acid, which also may be used in the ripening treatment. The acid is customarily a monobasic acid, such as hydrochloric acid or nitric acid.

The doped subpigmentary titanium dioxide, particles of which are often acicular in appearance when viewed under a microscope, may be subjected to post-treatment, including conventional surface treatment, by precipitating inorganic oxides on the particles of surface and/or the application of organic matter to file pigment particle. Moreover, in some cases it may be necessary to subject this product to a final milling with addition of organic compounds, e.g., silicon oils, polyalcohols, etc.

In order to determine the light stability of the subpigmentary titanium dioxide, it is subjected to a greying test.

The invention is described in further detail hereinafter by the following, non-limiting examples. In addition to examples of the preparation of subpigmentary material, bulk doping thereof, and test methods therefor, comparison examples of un-doped or only surface-coated subpigmentary particles are also included.

For the greying test, a laboratory mixer from the Collin Co. (Walzwerk 150) was used to work the powdery material into a PVC-U-system having the following composition:

1000 g PVC suspension (Solvic 271 GC);
1000 g PVC emulsion (Solvic 172 GA);
400 g polymethyl methacrylate (Degalan V26);
60 g tribasic lead sulfate (Naftovin T3);
20 g dibasic lead stearate (Interstab 3150);
20 g glyceryl monoleate (Loxiol G10).

One hundred grams of this master batch were introduced into a heated laboratory mixer (roller temperature 175±5° C., perimeter speed of the forward roller 15 min.$^{-1}$, rear roller 18 min.$^{-1}$). Material which dropped down was continuously returned to the rollers until a coherent film was formed. 3 g of titanium dioxide were sprinkled onto the film and worked into the film with continuous turning of the film. After mixing for ten minutes, the film was peeled off and cut into approximately 9×9 cm$^2$ size pieces. The film cuttings were cleaned with ethanol, placed in three layers into a templet frame and pressed between 2 polished chrome steel plates in a top pressure hydraulic press (temperature 150° C., press pressure 4N/mm$^2$, pressing time 4 minutes, cooling phase 8 minutes). The resulting sheets were cut into 2.5×2.5 cm$^2$ test samples which were subjected to a light exposure test. To protect them against uncontrolled exposure to light, the samples were stored in the dark.

Before exposure to light, the brightness $L_0^*$ was measured with a HUNTERLAB tristimulus colorimeter (measuring geometry 45°/0°, standard illuminant C, 1.2 cm diameter measuring opening). Then the test samples (maximum of 20) were inserted under the clamp rail of a Heraeus Co. SUNTEST CPS apparatus, flooded with distilled water and illuminated for 30 minutes with the xenon emitter. Immediately after completion of the exposure to light, the brightness $L_1^*$ was again measured. The brightness difference $\delta L^* = L_0^* - L_1^*$ serves as a measure of the greying and was used as an indicator of the photocatalytic activity of the titanium dioxide.

EXAMPLE 1:

(un-doped subpigmentary titanium dioxide, comparison sample).

220 g of an aqueous suspension of a washed titanium dioxide hydrate of the anatase type, calculated as TiO$_2$, which had been obtained by hydrolysis of a titanyl sulfate solution [obtained through digesting ilmenite in sulfuric acid, separating iron (II) sulfate heptahydrate, clarifying and evaporating] were diluted with distilled water to a suspension with a TiO$_2$ content of 26% (wt.), and this suspension was heated to 60° C.

The heated suspension was added over the course of 30 minutes with stirring to 550 g of an aqueous solution containing 50% (wt.) sodium hydroxide at 90° C. The resulting mixture was then held at the boiling point (about 108°) for 2 hours, then cooled to about 60° C. and filtered, and the filter cake was washed with distilled water until the sulfate content in the wash filtrate was less than 0.05 g/liter (SO$_4$ analysis by the BaCl$_2$ test).

A quantity of the washed filter cake corresponding to 100 g TiO$_2$ was pasted up with distilled water to a suspension with a TiO$_2$ content of 220 g/liter. After that 25% hydrochloric acid was added until a pH of 2.8 to 3.1 was attained in the mixture. The suspension was stirred for 10 minutes, and then the pH value was checked and corrected as necessary.

The suspension was heated to 60° C. and held for 30 minutes at this temperature. The mixture was treated with sufficient 25% hydrochloric acid to bring the weight ratio of hydrochloric added at this point, calculated as HCl to TiO$_2$, to 0.15:1 to 0.25:1. The mixture was then heated over about 30 minutes to boiling (boiling temperature about 108° C.) and held at the boiling temperature for 90 minutes.

The titanium dioxide present in the suspension was flocculated by neutralization with a sodium hydroxide solution up to a pH of 6 to 7 and subsequently separated by filtration and washed with distilled water and sodium sulfate solution (2.5 g/liter, 60°–80° C.) until free of chloride. An emulsion of dimethylpolysiloxane, corresponding to 2% (wt.) siloxane (relative to TiO$_2$), was mixed into the still moist filter paste, and the mixture was subsequently dried at 120° C. for between 10 and 16 hours. The dried product was milled in a laboratory mill.

Half of the product was tempered for 2 hours at 500° C. The loss of organic material, determined by carbon analysis, was replenished by addition of a corresponding amount of dimethylpolysiloxane emulsion, and dried and milled again.

After drying, the resulting subpigmentary titanium dioxide consisted of needle-like particles. After thermal treatment at 500° C. the subpigmentary titanium dioxide consisted of more spherical particles whose crystalline regions possessed the rutile structure. The average particle size of the needle-like product was 100 nm (longest axis); that of the spherical product was about 90 nm.

After a temperature treatment at 120° C., this undoped subpigmentary titanium dioxide showed a $\delta L^*$ of 41.1 in the above-described greying test; after a temperature treatment of 500° C., it showed a $\delta L^*$ of 23.5 (see Table 1).

EXAMPLE 2:

(subpigmentary TiO$_2$ doped with antimony).

The starting material and the pre-treatment up to pasting with distilled water and addition of 25% hydrochloric acid up to pH 2.8 to 3.1 and the 10 minute waiting time corresponded to Example 1.

0.1 atom % Sb$^{3+}$(2a), 1 atom % Sb$^{3+}$(2b) and 2 atom % Sb$^{3+}$(2c), respectively, (as SbCl$_3$) were each completely dissolved in 5 ml portions of 25% HCl (2a–c) at room temperature, and half of this volume was added dropwise to the suspension over 5 minutes with stirring. The suspension was heated to 60° C. and was held at this temperature for 30 minutes.

Sufficient 25% hydrochloric acid was added to the remaining hydrochloric acid containing the doping agent until the weight ratio (calculated as HCl to TiO$_2$) of the hydrochloric acid added at this point, minus the hydrochloric acid added in the first doping step, amounted to 0.15 to 1. The procedure was then continued as in Example 1 beginning with the step of heating to boiling temperature over the course of 30 minutes. Depending on the preceding thermal treatment at 120° C. or 500° C., the greying after 30 minutes of irradiation decreased significantly with increasing doping concentration (see Table 1). The thermal treatment decreased the water content and produced better rutilization or improved rutile mixed crystal formation.

EXAMPLE 3:

(Doping with nickel).

The doping was carried out as in Example 2. The dissolution of NiCl$_2$.6H$_2$O at 0.1 atom % took place in 5 ml of 25% HCl, and at 1 atom % and 2 atom % in 20 ml of HCl. The results are compiled in the table under 3a to 3c. In comparison with doping with Sb, the photostability was improved.

EXAMPLE 4:

(Doping with antimony and nickel).

A mixture of antimony 3+ and nickel 2+ was used as the dopant. In doping jointly with 0.1 atom % Sb$^{3+}$ and 0.1 atom % $Ni^{2+}$, the respective quantities were dissolved in 20 ml of 25% HCl; in doping jointly with 2 atom % $Sb^{3+}$ and 2 atom % $Ni^{2+}$, the respective amounts were dissolved in the total volume of hydrochloric acid required for peptization. The greying test showed a further improvement in the photostability (see Table I, 4a and 4b).

EXAMPLE 5:

(Comparison example, precipitation instead of doping).

Subpigmentary titanium dioxide was prepared using a procedure corresponding to Example 1. After holding at the boiling temperature for 90 minutes, the suspension was cooled, and 1 atom % (5a) or 2 atom % (5b) $Sb^{3+}$ as antimony chloride, in each case relative to titanium, was added dropwise with stirring. After that 30% (wt.) sodium hydroxide was added dropwise to a pH of 7.7 to 8.3. Thereafter, the mixture was filtered, washed free of chloride, and an emulsion of dimethylpolysiloxane (corresponding to 2% (wt.) siloxane based on $TiO_2$) was mixed into the still moist filter paste and subsequently dried at 120° C. for 10 to 16 hours. The dried product was ground in a laboratory mill.

EXAMPLE 6:

(Controlling the particle size with tin oxide and doping with nickel).

In addition to doping with $Ni^{2+}$, this example describes controlling the particle size of the subpigmentary titanium dioxide (see U.S. Pat. No. 5,215,580; the disclosure of which is incorporated herein by reference). After doping with the first, partial quantity of the dopant and the 30 minute heating to 60° C., 4% (wt.), based on $TiO_2$, of a colloidal tin oxide solution was added dropwise to the paste. The colloidal tin oxide solution was prepared as follows: tin tetrachloride (p.a. 99% $SnCl_4$) was added dropwise to a container of distilled water under cooling up to a concentration of 200 g/liter $SnO_2$. The volume of stock solution corresponding to the amount of tin oxide required in the preparation of the subpigmentary titanium dioxide for control of a specific particle size, was diluted with distilled water to 10 g/liter of $SnO_2$. During the dilution, the temperature was not permitted to climb above 20° C. This mixture was held at 20° C. for one hour in order to ripen The solution then had to be used without further delay.

The resulting subpigmentary titanium dioxide had a rutile structure, was needle-like, and had an average particle size of 30 nm (longest axis).

The results of the greying measurement were slightly worse than the measured values of the products in Example 3. The cause of the increased photoactivity was believed to lie in the increase in the specific surface of the subpigmentary titanium dioxide because of the smaller particle size.

EXAMPLE 7:

(Comparison to Example 6 but without dopant).

Very poor greying values were obtained from undoped subpigmentary titanium dioxide prepared with tin oxide nuclei (see Table 1).

TABLE 1

| Example No. | Dopant Used | Compound Added | Conc. Atom-% | Amount Added/g | Addition of $SnO_2$ | Thermal Treat./° C. | Greying $\delta L^*$ (30 Min.) |
|---|---|---|---|---|---|---|---|
| 1 | none | — | 0 | — | no | 120 | 41.1 |
|   |      |   |   |   |    | 500 | 23.5 |
| 2a |  |  | 0.1 | 0.285 |  | 120 | 38.6 |
|    |  |  |     |       |  | 500 | 23.5 |
| 2b | $Sb^{3+}$ | $SbCl_3$ | 1 | 2.85 | no | 120 | 29.7 |
|    | intraXtal |          |   |      |    | 500 | 18.6 |
| 2c |  |  | 2 | 5.70 |  | 120 | 25.4 |
|    |  |  |   |      |  | 500 | 14.2 |
| 3a |  |  | 0.1 | 0.297 |  | 120 | 36.8 |
|    |  |  |     |       |  | 500 | 23.5 |
| 3b | $Ni^{2+}$ | $NiCl_2.6H_2O$ | 1 | 2.97 | no | 120 | 27.7 |
|    | intraXtal |                 |   |      |    | 500 | 12.1 |
| 3c |  |  | 2 | 5.94 |  | 120 | 20.0 |
|    |  |  |   |      |  | 500 | 4.9 |
| 4a |  |  | 0.1/0.1 | 0.285/0.297 |  | 120 | 34.0 |
|    | $Sb^{3+}/Ni^{2+}$ | $SbCl_2/$ |  |  | no | 500 | 19.6 |
| 4b | intraXtal | $NiCl_2.6H_2O$ | 2/2 | 5.70/5.94 |  | 120 | 17.2 |
|    |  |  |  |  |  | 500 | 1.8 |
| 5a | $Sb^{3+}$ | $SbCl_3$ | 1 | 2.85 | no | 120 | 34.8 |
| 5b | precipitate |  | 2 | 5.70 |  | 120 | 30.9 |
| 6a | $Ni^{2+}$ | $NiCl_2.6H_2O$ | 2 | 5.94 | yes | 120 | 22.9 |
| 6b | intraXtal |  |  |  |  | 500 | 10.9 |
| 7a | none | — | 0 | — | yes | 120 | 45.6 |
| 7b |  |  |  |  |  | 500 | 34.6 |

As can be seen from Table 1, the greying values 5a and 5b are clearly worse in comparison with samples produced by intracrystalline doping with identical quantities of the dopant (Examples 2b and 2c).

EXAMPLE 8:

(Difference between a subpigmentary particle with Sb-doping and a subpigmentary particle with precipitated Sb).

a) Leaching Test.

Subpigmentary titanium dioxide doped with antimony prepared according to the invention as in Example 2c and titanium dioxide coated with antimony as in Example 5b were each reacted, after a thermal treatment at 500° C., with 98% sulfuric acid at 100°, 140° and 180° C., respectively, for 2 hours. The quantity of antimony released in each solution in this leaching test was analyzed by atomic emission spectroscopy with inductively coupled plasma (ICP-AES). It can be seen in Table 2 that, as expected, precipitated antimony dissolved to a greater extent at a lower temperature than was the case with the doped subpigmentary particles. In the case of the latter product, the antimony present in the lattice went into solution only gradually with progressive disintegration of the titanium dioxide lattice.

TABLE 2

| Leaching Test (Sb concentration 2 Atom-%). | | |
|---|---|---|
| Temperature in °C. | Dissolved Sb/TiO$_2$ in % with doped Sb | Dissolved Sb/TiO$_2$ in % with precipitated Sb |
| 100 | 0.4 | 4.2 |
| 140 | 1.3 | 3.5 |
| 180 | 3.1 | 3.1 |

(Each sample heat treated at 500° C.)

b) X-Ray structure analysis.

It is known that the formation of rutile mixed phase compounds of antimony and nickel produces a displacement of the X-ray reflection in X-ray structure analysis. With pure rutile, this reflection is expected at an angle $2\theta = 54.0$ to $54.5°$ (H. B Krause, H. W. Reamer, J. L. Martin, *Mat. Res. Bul.*, Vol. 3 (1968) pp. 233–240 and H. B. Krause, *Mat. Res. Bul.*, Vol. 3 (1968) pp. 241–252).

With un-doped subpigmentary titanium dioxide (as in Example 1) an angle of 54.4° was measured. Subpigmentary titanium dioxide with a 2 atom % precipitated antimony as in Example 5b, shows an unchanged x-ray reflection at $2\theta = 54.4°$. In contrast thereto, if the antimony is deposited in the subpigmentary titanium dioxide particles intracrystallinely as in Example 2c, the angle was significantly altered to $2\theta = 54.3°$. According to H. B. Krause et al., this change of angle can be correlated with the formation of a rutile mixed crystal compound.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A process for preparing metal ion-doped subpigmentary titanium dioxide particles having improved photostability wherein the metal ion-dopant is homogeneously intracrystalline-distributed internally in the subpigmentary titanium dioxide particles, said process comprising the steps of:
   (a) providing a suspension of subpigmentary titanium dioxide;
   (b) introducing a first portion of a metal ion-dopant into the suspension;
   (c) maturing the suspension for a first period of time;
   (d) introducing the remainder of the metal ion-dopant into the suspension;
   (e) maturing said suspension for a second period of time;
   (f) recovering subpigmentary titanium dioxide from said suspension;
   thereby producing metal ion-doped subpigmentary titanium dioxide particles with the dopant distributed intracrystallinely throughout the particles.

2. A process according to claim 1, further comprising subjecting the subpigmentary titanium dioxide particles to a posttreatment consisting of precipitating inorganic oxides on the subpigmentary titanium dioxide particles.

3. A process according to claim 1, wherein the dopant comprises at least one metal ion selected from the group consisting of ions of iron, antimony, zinc, manganese, niobium, vanadium, nickel, copper and tantalum.

4. A process according to claim 1, further comprising introducing a solution or suspension of colloidal tin oxide particles having an average particle size in the range from 1 to 10 nm into the suspension of titanium dioxide after introducing the first portion of the dopant.

5. A process according to claim 4, wherein the suspension of titanium dioxide and the first portion of dopant is heated to a temperature of about 60° C. for a period of at least about 30 minutes prior to introdution of the remainder of the dopant.

6. A process according to claim 1, wherein the subpigmentary titanium dioxide is prepared by hydrolysis of a titanyl sulfate solution.

7. A process according to claim 4, wherein the solution containing colloidal tin oxide has an average particle size of less than 4 nm and is introduced into said suspension to limit the particle size of the subpigmentary titanium dioxide produced.

8. A process according to claim 1, wherein said metal ion-doped subpigmentary titanium dioxide particles are recovered by filtering.

9. A process according to claim 1, wherein said metal ion, doped subpigmentary titanium dioxide particles are subjected to at least one post-treatment step selected from the group consisting of washing, drying, tempering, grinding, inorganic post treatment and final milling.

10. A process according to claim 1, further comprising subjecting the metal ion-doped subpigmentary titanium dioxide particles to a tempering treatment to increase at least one of (1) the degree of rutilization of the particles and (2) rounding of the particles.

11. Subpigmentary titanium dioxide particles, wherein said particles comprise a crystalline lattice with a metal ion-dopant for improving photostability distributed intracrystallinely throughout said lattice.

12. Subpigmentary titanium dioxide particles according to claim 11, wherein the dopant comprises at least one metal ion selected from the group consisting of ions of iron, antimony, zinc, manganese, niobium, vanadim, nickel, copper and tantalum.

13. Subpigmentary titanium dioxide particles according to claim 11, wherein the particles are spherical and have an average particle size in the range from about from 10 to 100 nm.

14. Subpigmentary titanium dioxide particles according to claim 13, wherein the particles have an average particle size in the range from about 20 to 80 nm.

15. Subpigmentary titanium dioxide particles according to claim 11, wherein the particles are acicular.

16. Subpigmentary titanium dioxide particles according to claim 11, wherein the particles contain from 0.1 to 5 atom-% of the dopant.

* * * * *